(12) United States Patent
Usami

(10) Patent No.: US 8,773,875 B2
(45) Date of Patent: Jul. 8, 2014

(54) POWER CONVERSION APPARATUS

(75) Inventor: Yutaka Usami, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/595,038

(22) Filed: Aug. 27, 2012

(65) Prior Publication Data

US 2013/0070500 A1 Mar. 21, 2013

(30) Foreign Application Priority Data

Sep. 21, 2011 (JP) ................................. 2011-206112

(51) Int. Cl.
*H02M 5/42* (2006.01)

(52) U.S. Cl.
USPC .......................................................... 363/89

(58) Field of Classification Search
USPC ............. 363/16, 37, 44, 80, 84, 89, 125, 126, 363/131, 132
See application file for complete search history.

(56) References Cited

U.S. PATENT DOCUMENTS

| 4,277,692 | A | * | 7/1981 | Small ............................... 307/66 |
| 6,034,489 | A | * | 3/2000 | Weng ............................. 315/307 |
| 2011/0032731 | A1 | * | 2/2011 | Coleman et al. ........... 363/21.12 |

FOREIGN PATENT DOCUMENTS

| JP | 2007-110869 | 4/2007 |
| JP | 2008-295248 | 4/2008 |

* cited by examiner

*Primary Examiner* — Adolf Berhane
*Assistant Examiner* — Yemane Mehari
(74) *Attorney, Agent, or Firm* — Amin, Turocy & Watson, LLP

(57) ABSTRACT

According to one embodiment, a power conversion apparatus includes a first LC circuit, a first switch, a second switch, a smoothing capacitor, a second LC circuit and a controller. The first switch is connected to the AC power supply through the first LC circuit. The second switch is connected in series to the first switch. The smoothing capacitor is connected in parallel to a series circuit of the first switch and the second switch. The second LC circuit is connected between a connection point between the first switch and the second switch and a load. The controller outputs a first pulse signal to the first switch when a voltage polarity of the AC power supply is positive, and outputs a second pulse signal to the second switch when the voltage polarity is negative.

10 Claims, 10 Drawing Sheets

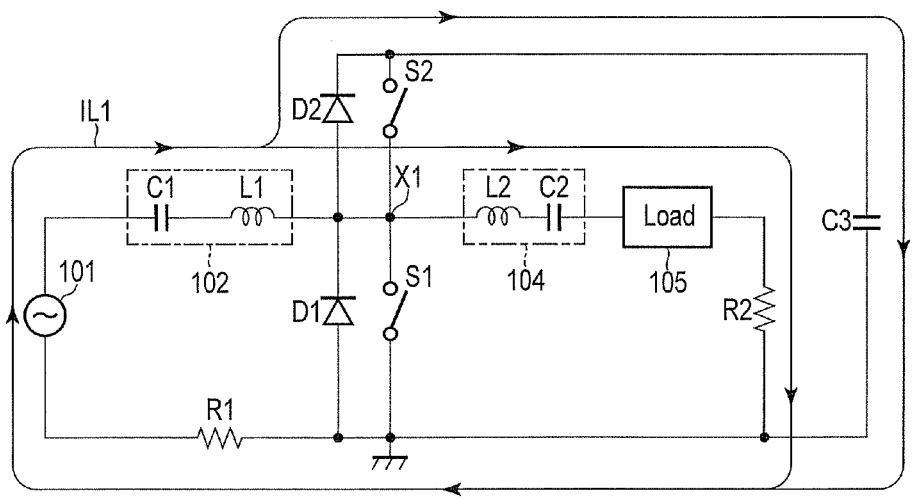
F I G. 5
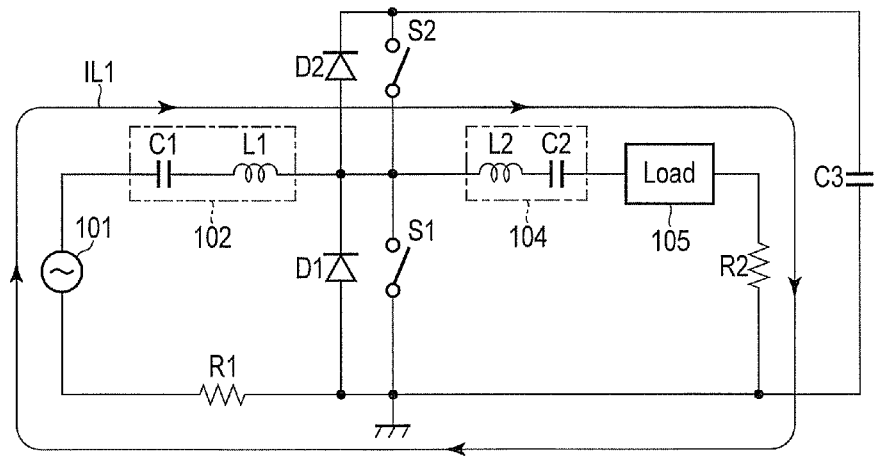
F I G. 6

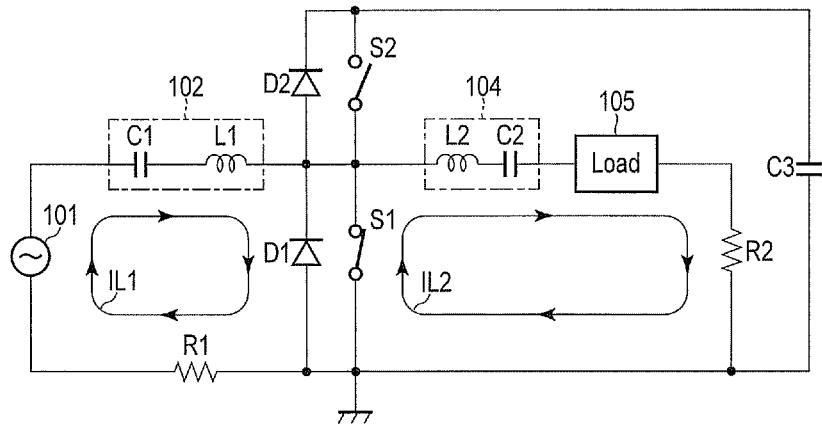
F I G. 7
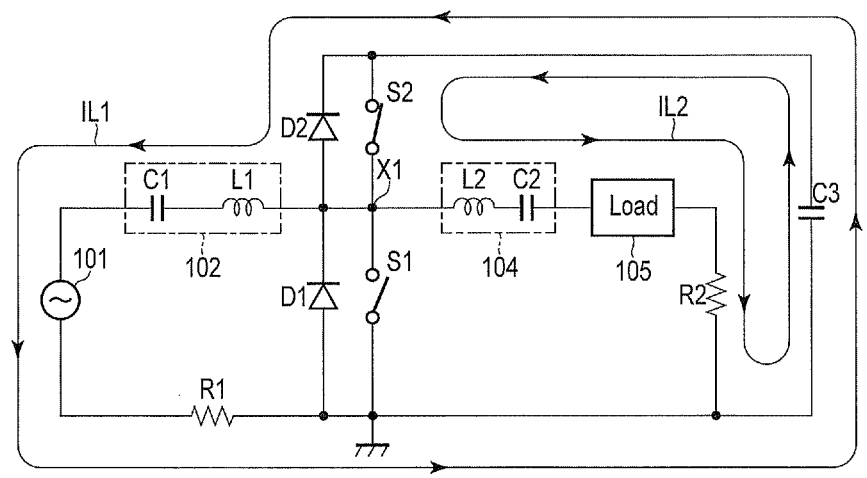
F I G. 8

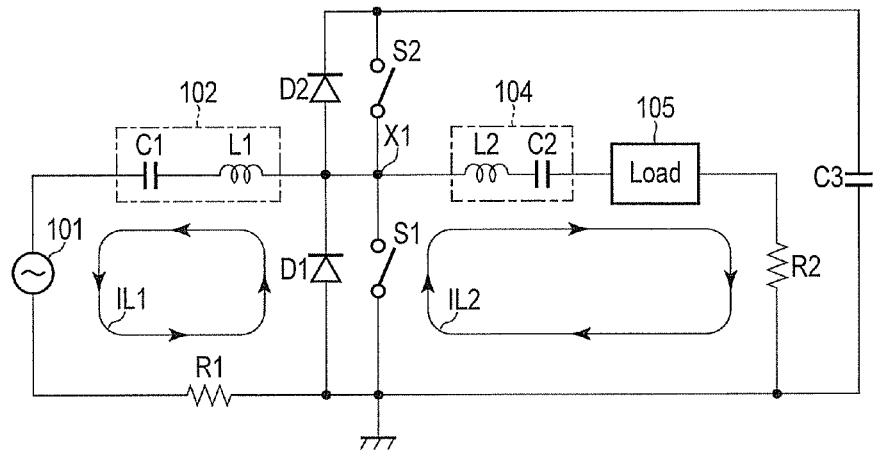
F I G. 9
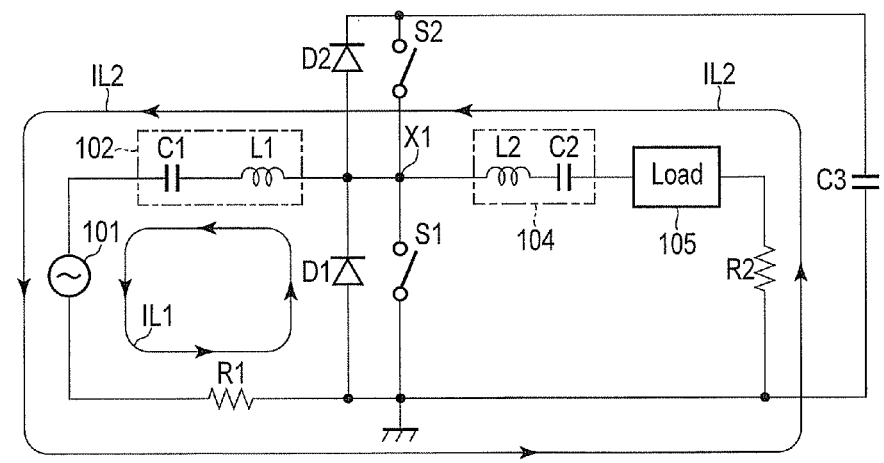
F I G. 10

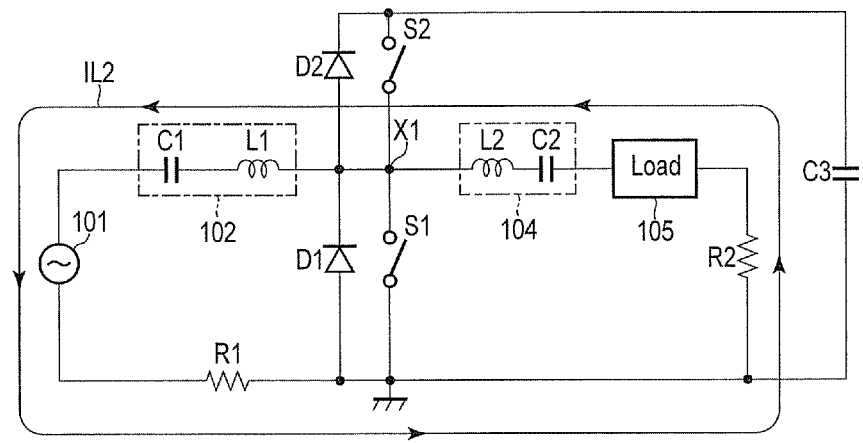
F I G. 11
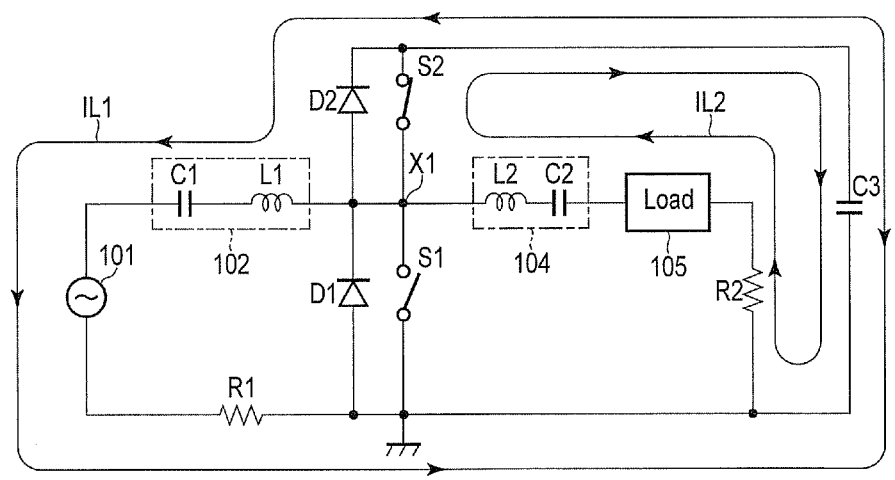
F I G. 12

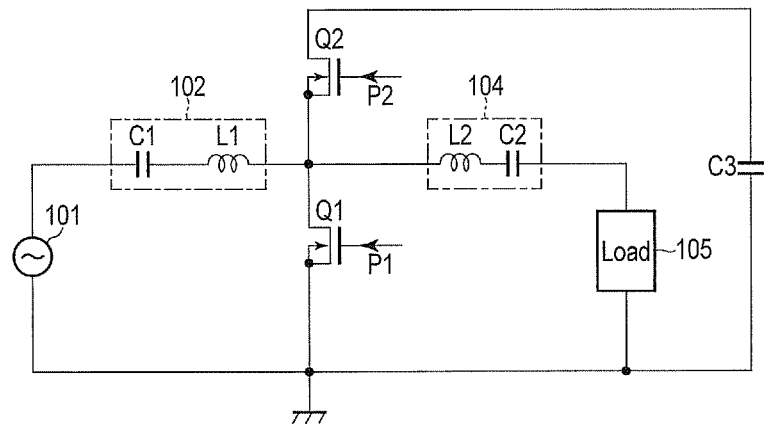
F I G. 18
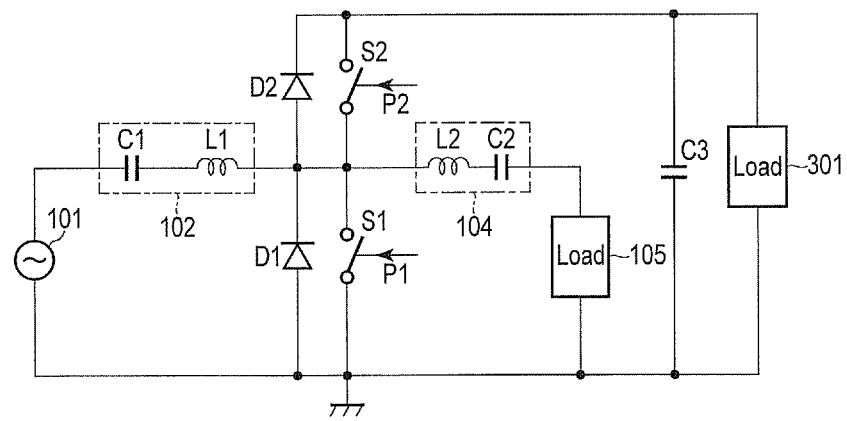
F I G. 19

POWER CONVERSION APPARATUS

CROSS-REFERENCE TO RELATED APPLICATIONS

This application is based upon and claims the benefit of priority from Japanese Patent Application No. 2011-206112, filed on Sep. 21, 2011, the entire contents of which are incorporated herein by reference.

FIELD

Embodiments described herein relate generally to a power conversion apparatus which converts AC voltage supplied from an AC power supply to DC voltage and supplies power to a load.

BACKGROUND

As methods of converting AC voltage to DC voltage, following two methods are generally known.

In the first method, a diode bridge circuit and a smoothing capacitor are used. The diode bridge circuit full-wave rectifies an alternating current from an AC power supply. The smoothing capacitor smoothes a direct current after full-wave rectification.

In the first method, in either case where the AC voltage is positive or negative, current always flows through a series circuit of two diodes. At this time, in each of the two diodes, power loss corresponding to the product of the current flowing through the diode and the forward voltage of the diode occurs.

In the second method, a power factor improving converter (PFC) intervenes between the diode bridge circuit and the smoothing capacitor of the first method. The power factor improving converter raises the DC voltage full-wave rectified by the diode bridge circuit.

Also in the second method, since the current flows through the series circuit of two diodes at the time of full-wave rectification, power loss occurs. In addition to that, since current alternately flows through a field effect transistor (FET) constituting the power factor improving converter and a diode, further loss occurs.

Besides, in order that the power factor improving converter converts the waveform of an input current into a sine wave, the output voltage must be set to be higher than the input voltage. However, a voltage required for a load is not necessarily a voltage higher than the input voltage. In that case, a step-down converter is connected to the latter stage of the power factor improving converter, and the voltage raised by the power factor improving converter is reduced to a desired voltage. Also when the voltage is reduced, a loss occurs. The whole power conversion apparatus includes three stages of the AC-DC conversion, the DC-DC (step-up) conversion and the DC-DC (step-down) conversion, and the power loss appears as a product of these. For example, if the efficiency of one stage is 0.95, the efficiency of the three stages becomes 0.95×0.95×0.95=0.86. That is, even if the conversion efficiency is as high as 95%, the efficiency is reduced to 86% in the three-stage connection. As described above, even if the conversion efficiency of each stage is high, the conversion efficiency extremely decreases in multiple stages.

Recently, energy saving of electronic equipments is demanded, and as part thereof, the improvement of the conversion efficiency of a power conversion apparatus to supply power to a load is required. However, the improvement of the conversion efficiency is limited in the related art circuit structure.

BRIEF DESCRIPTION OF THE DRAWINGS

FIG. 5 is a schematic view showing a state of circuit currents IL1 and IL2 in operation mode [Phase 3].

FIG. 6 is a schematic view showing a state of circuit currents IL1 and IL2 in operation mode [Phase 4].

FIG. 7 is a schematic view showing a state of circuit currents IL1 and IL2 in operation mode [Phase 5].

FIG. 8 is a schematic view showing a state of circuit currents IL1 and IL2 in operation mode [Phase 6].

FIG. 9 is a schematic view showing a state of circuit currents IL1 and IL2 in operation mode [Phase 7].

FIG. 10 is a schematic view showing a state of circuit currents IL1 and IL2 in operation mode [Phase 8].

FIG. 11 is a schematic view showing a state of circuit currents IL1 and IL2 in operation mode [Phase 9].

FIG. 12 is a schematic view showing a state of circuit currents IL1 and IL2 in operation mode [Phase 10].

FIG. 14 is an equivalent circuit diagram of a main part when a first switch is turned on.

FIG. 18 is a circuit diagram of a case where a MOS field effect transistor is used as a switch.

FIG. 19 is a circuit diagram of a case where a second load is connected to both ends of a smoothing capacitor.

DETAILED DESCRIPTION

In general, according to one embodiment, a power conversion apparatus includes a first LC circuit, a first switch, a second switch, a smoothing capacitor, a second LC circuit and a controller.

The first LC circuit includes a first capacitor and a first inductor connected in series to each other, and is connected to an AC power supply. The first switch is connected to the AC power supply through the first LC circuit. The second switch is connected in series to the first switch. The smoothing capacitor is connected in parallel to a series circuit of the first switch and the second switch. The second LC circuit includes a second capacitor and a second inductor connected in series to each other, and is connected between a connection point between the first switch and the second switch and a load. The controller outputs a first pulse signal for pulse-driving the first switch to the first switch when a voltage polarity of the AC power supply is positive. Besides, the controller outputs a second pulse signal for pulse-driving the second switch to the second switch when the voltage polarity of the AC power supply is negative.

First Embodiment

Figure 1:
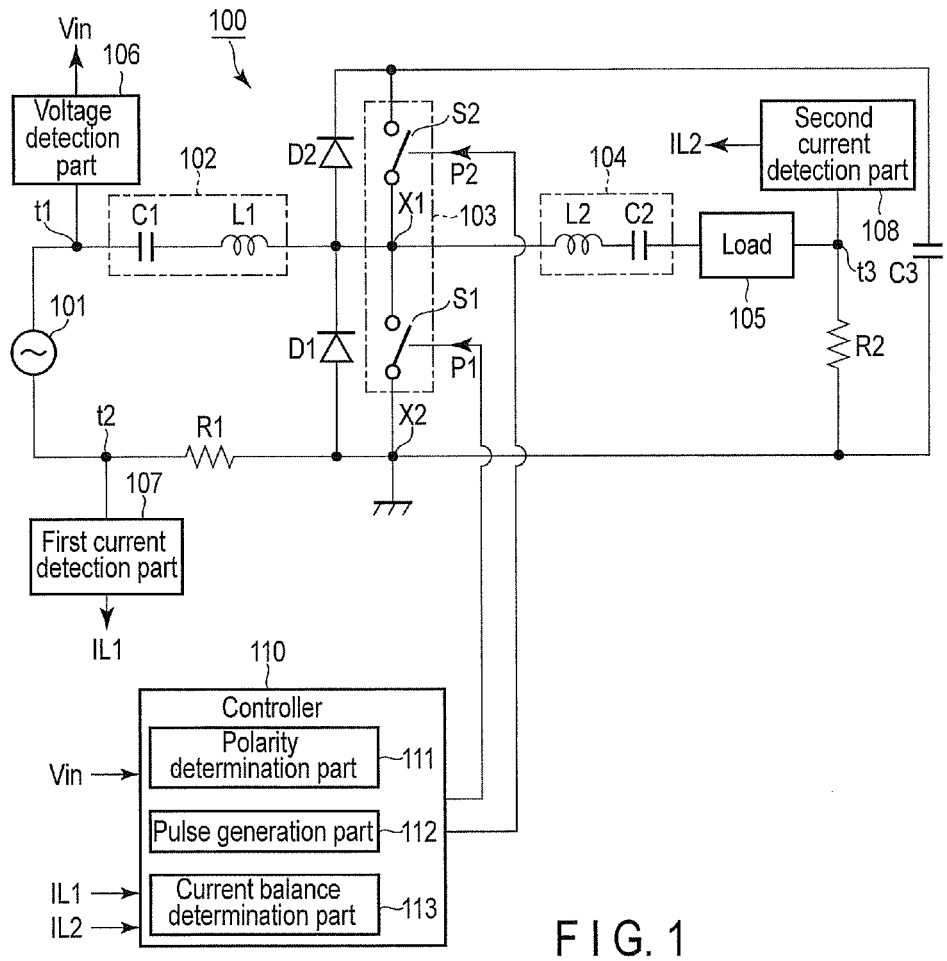
FIG. 1 is a total structural view including a main circuit of a power conversion apparatus of a first embodiment.

FIG. 1 is a circuit structural view of a power conversion apparatus 100 of a first embodiment. The power conversion apparatus 100 includes a first LC circuit 102 in which a first capacitor C1 and a first inductor L1 are connected in series to each other. In the power conversion apparatus 100, the first LC circuit 102 is connected to one end of an AC power supply 101. Besides, in the power conversion apparatus 100, a first switch S1 is connected in series to the first LC circuit 102, and the first switch S1 is connected to the other end of the AC power supply 101.

In the power conversion apparatus 100, a second switch S2 is connected to a connection point X1 between the first LC circuit 102 and the first switch S1, and a series circuit 103 of the first switch S1 and the second switch S2 is formed. Besides, in the power conversion apparatus 100, a smoothing capacitor C3 is connected in parallel to the series circuit 103. A connection point X2 between the first switch S1 and the smoothing capacitor C3 has a ground potential GND. In the following, the connection point X2 is called a ground terminal X2.

The first switch S1 and the second switch S2 are mechanical switches. In the power conversion apparatus 100, a first diode D1 is connected in parallel to the first switch S1, and a second diode D2 is connected in parallel to the second switch S2. Specifically, the cathode of the first diode D1 is connected to the ground terminal X2, and the anode of the second diode D2 is connected thereto.

The power conversion apparatus 100 includes a second LC circuit 104 in which a second capacitor C2 and a second inductor L2 are connected in series to each other. In the power conversion apparatus 100, the second LC circuit 104 is connected to the connection point X1. In the power conversion apparatus 100, a load 105, for example, a resistor is connected between the second LC circuit 104 and the ground terminal X2.

In the power conversion apparatus 100, a first terminal t1 is provided between the AC power supply 101 and the LC circuit 102. In the power conversion apparatus 100, a voltage detection part 106 is connected to the first terminal t1. The voltage detection part 106 detects a voltage of the first terminal t1 with respect to the ground potential GND, that is, a voltage Vin (positive or negative) of the AC power supply 101.

In the power conversion apparatus 100, a second terminal t2 is provided on the AC power supply 101 side with respect to the ground terminal X2 through a first resistor R1. In the power conversion apparatus 100, a first current detection part 107 is connected to the second terminal t2. The first resistor R1 having a very low resistance value is used.

When the first switch S1 is turned on, a closed circuit in which the AC power supply 101, the first LC circuit 102, the first switch S1 and the first resistor R1 are sequentially connected is formed. When a current flows through the closed circuit, a minute voltage in proportion to the current flowing through the closed circuit is generated in the first resistor R1. For example, when a positive current flows through the closed circuit, a negative voltage with respect to the ground potential GND is generated at the second terminal t2. The first current detection part 107 converts the voltage generated at the second terminal t2 to a current and outputs the current. That is, the first current detection part 107 detects a first current IL1 flowing through the first inductor L1.

Incidentally, the first resistor R1 for detecting the first current IL1 is not limited to the illustrated position. The first resistor R1 may be provided, for example, between the first capacitor C1 and the first inductor L1. In brief, any place may be adopted as long as the first current IL1 can be detected.

In the power conversion apparatus 100, a third terminal t3 is provided on the load 105 side with respect to the ground terminal X2 through a second resistor R2. In the power conversion apparatus 100, a second current detection part 108 is connected to the third terminal t3. The second resistor R2 having a very low resistance value is used.

When the first switch S1 is turned on, a closed circuit in which the first switch S1, the second LC circuit 104, the load 105 and the second resistor R2 are sequentially connected is formed. When a current flows through the closed circuit, a minute voltage in proportion to the current flowing through the closed circuit is generated in the second resistor R2. For example, when a positive current flows through the closed circuit, a negative voltage with respect to the ground potential GND is generated at the third terminal t3. The second current detection part 108 converts the voltage generated at the third terminal t3 to a current and outputs the current. That is, the second current detection part 108 detects a second current IL2 flowing through the second inductor L2.

Incidentally, the second resistor R2 for detecting the second current IL2 is not limited to the illustrated position. The second resistor R2 may be provided, for example, between the second capacitor C2 and the second inductor L2. In brief, any place may be adopted as long as the second current IL2 can be detected.

The power conversion apparatus 100 includes a controller 110. The voltage Vin detected by the voltage detection part 106 and the first and the second currents IL1 and IL2 detected by the first and the second current detection parts 107 and 108 are inputted to the controller 110.

The controller 110 includes a polarity determination part 111, a pulse generation part 112 and a current balance determination part 113.

The polarity determination part 111 determines, based on the voltage Vin of the AC power supply 101 detected by the voltage detection part 106, whether the polarity of the voltage Vin is positive or negative. The controller 110 notifies the pulse generation part 112 of the information indicating the determination result of the polarity determination part 111, that is, the information indicating whether the polarity of the voltage Vin is positive or negative.

Figure 2:
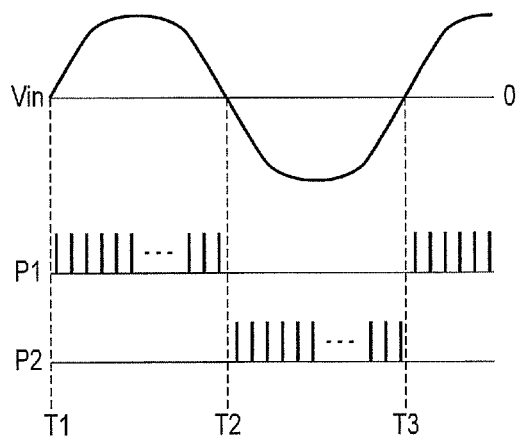
FIG. 2 is a waveform view showing output timings of pulse signals P1 and P2 with respect to a voltage Vin of an AC power supply.

The pulse generation part 112 generates a first pulse signal P1 for pulse-driving the first switch S1 and a second pulse signal P2 for pulse-driving the second switch S2. Specifically, as shown in FIG. 2, when the voltage polarity of the AC power supply 101 is positive, the first pulse signal P1 is generated, and when negative, the second pulse signal P2 is generated. The pulse frequency of the first pulse signal P1 and the second pulse signal P2 is extremely higher than the frequency of the AC power supply 101. The controller 110 outputs the first pulse signal P1 to the first switch S1, and causes the first switch S1 to perform a switching operation at the frequency higher than the frequency of the AC power supply 101. Besides, the controller 110 outputs the second pulse signal P2 to the second switch S2, and causes the second switch S2 to perform a switching operation at the frequency higher than the frequency of the AC power supply 101.

The current balance determination part 113 compares the first current IL1 with the second current IL2 and determines whether both the currents IL1 and IL2 are equal to each other. If the current balance determination part 113 determines that both the currents IL1 and IL2 are equal to each other when the first switch S1 is off, the controller 110 recognizes that a current balance state occurs. Then, the controller 110 controls the first pulse signal P1 so that the first switch S1 is tuned on. Similarly, if the current balance determination part 113 determines that both the current IL1 and IL2 are equal to each other when the second switch S2 is off, the controller 110 recognizes that the current balance state occurs. Then, the controller 110 controls the second pulse signal P2 so that the second switch S2 is turned on.

Next, the operation of the power conversion apparatus 100 will be described with reference to FIG. 3 to FIG. 12. First, the operation when the polarity of the voltage Vin of the AC power supply 101 is positive will be described with reference to FIG. 3 to FIG. 7. When the polarity of the voltage Vin of the AC power supply 101 is positive, the first pulse signal P1 is outputted from the controller 110, and the first switch S1 repeats on and off.

Figure 3:
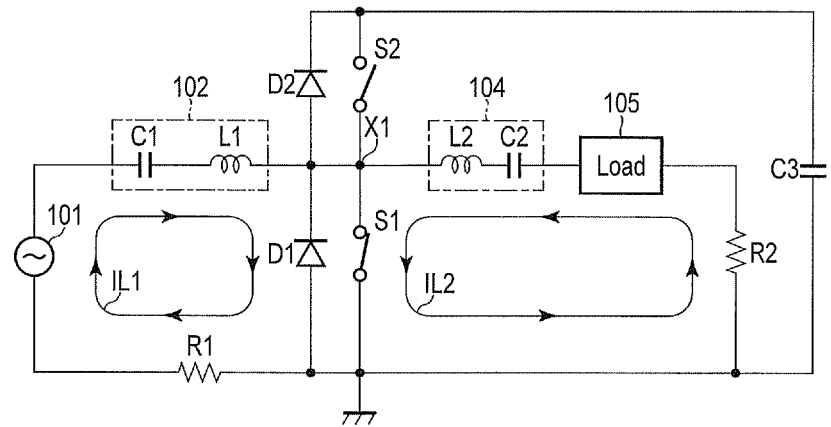
FIG. 3 is a schematic view showing a state of circuit currents IL1 and IL2 in operation mode [Phase 1].

When the first switch S1 is turned on, as shown in FIG. 3, the closed circuit of the AC power supply 101, the first LC circuit 102, the first switch S1 and the resistor R1 is formed. As a result, the first current IL1 flows in the direction from the first capacitor C1 to the ground potential GND through the first switch S1 by the linear reactor action of the first inductor L1. Besides, when the first switch S1 is turned on, the closed circuit of the first switch S1, the resistor R2, the load 105 and the second LC circuit 104 is also formed. As a result, the second current IL2 flows in the direction from the second capacitor C2 to the ground potential GND through the first switch S1. The operation mode at this time is called [Phase 1].

In the operation mode [Phase 1], the first current IL1 linearly increases at an gradient proportional to the voltage Vin of the AC power supply 101. As the first current IL1 increases, the second current IL2 also increases.

Figure 4:
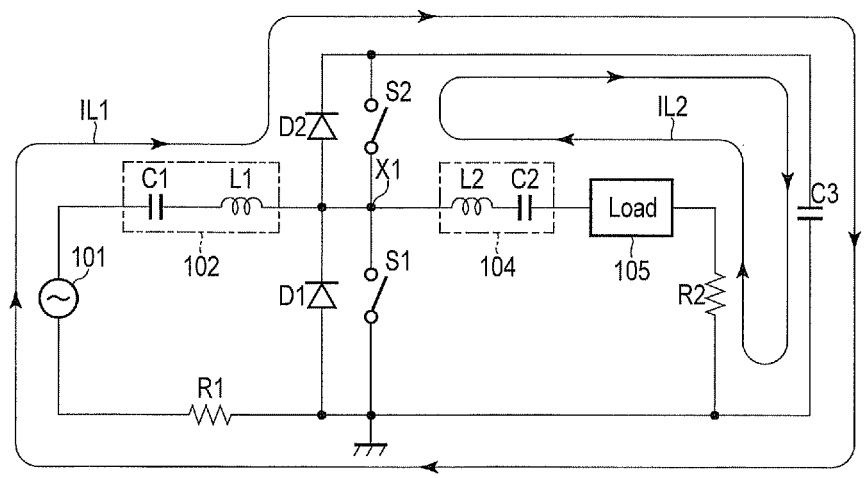
FIG. 4 is a schematic view showing a state, of circuit currents IL1 and IL2 in operation mode [Phase 2].

Next, when the first switch S1 is turned off, the first inductor L1 causes the first current IL1 to continue flowing in the same direction by the reactor energy. Thus, as shown in FIG. 4, the first current IL1 flows to the smoothing capacitor C3 through the second diode D2. Similarly, the second current IL2 also flows to the smoothing capacitor C3 through the second diode D2. The operation mode at this time is called [Phase 2].

In the operation mode [Phase 2], the first current IL1 decreases at a gradient corresponding to a potential difference between the smoothing capacitor C3 and the first capacitor C1. Similarly, the second current IL2 decreases at a gradient corresponding to a potential difference between the smoothing capacitor C3 and the second capacitor C2.

On the other hand, the potential of the smoothing capacitor C3 to which the first and the second currents IL1 and IL2 flow rises. When the second inductor L2 exhausts the reactor energy, the second current IL2 is reversed. However, at this time point, since the current amount of the first current IL1 is large, as shown in FIG. 5, part of the first current IL1 flows through the second LC circuit 104. The operation mode at this time is called [Phase 3].

In the operation mode [Phase 3], the remainder of the first current IL1 flows through the second diode D2. Thus, a potential Vm at the connection point X1 remains equal to the potential of the smoothing capacitor C3 continuously from the operation mode [Phase 2].

In the operation mode [Phase 3], the first current IL1 decreases. As shown in FIG. 6, the current IL1 flowing to the smoothing capacitor C3 through the second diode D2 stops. Then, the first current IL1 detected by the first current detection part 107 becomes equal to the second current IL2 detected by the second current detection part 108. That is, the controller 110 determines that the current balance state occurs. The operation mode at this time is called [Phase 4].

At the operation mode [Phase 4], a current through the second diode D2 does not flow. Thus, the potential Vm at the connection point X1 becomes an intermediate voltage between the voltage of the smoothing capacitor C3 and the ground potential GND.

If the controller 110 determines that the current balance state occurs, the first switch S1 is again turned on. Then, as shown in FIG. 7, the first current IL1, which flowed in the direction from the first LC circuit 102 to the second LC circuit 104, flows through the first switch S1. As a result, the potential Vm at the connection point X1 becomes equal to the ground potential GND. At this time, the second inductor L2 causes the second current IL2 to continue flowing in the same direction as that in the operation mode [Phase 4] by the reactor energy. Thus, the second current IL2 flows in the direction in which the second capacitor C2 is charged from the ground potential GND. The operation mode at this time is called [Phase 5].

Thereafter, when the charge of the second capacitor C2 is sufficiently stored, the direction of the second current IL2 is reversed. That is, a return is made to the operation mode [Phase 1]. After this, during the period in which the polarity of the voltage of the AC power supply 101 is positive, the power conversion apparatus 100 repeats the cycle of the operation mode [Phase 1]→[Phase 2]→[Phase 3]→[Phase 4]→[Phase 5]→[Phase 1].

Next, the operation when the polarity of the voltage of the AC power supply 101 is negative will be described with reference to FIG. 8 to FIG. 12. When the polarity of the voltage Vin of the AC power supply 101 is negative, the second pulse signal P2 is outputted from the controller 110, and the second switch S2 repeats on and off.

When the second switch S2 is turned on, as shown in FIG. 8, a closed circuit of the AC power supply 101, the first LC circuit 102, the second switch S2 and the smoothing capacitor C3 is formed. At this time, the voltage of the smoothing capacitor C3 is higher than AC voltage Vin. Accordingly, the first current IL1 flows so that the charged voltage of the smoothing capacitor C3 returns to the AC power supply 101 through the second switch S2 and the first LC circuit 102. At the same time, a closed circuit of the second LC circuit 104, the second switch S2, the smoothing capacitor C3 and the resistor R2 is formed through the load 105. Thus, the second current IL2 flows from the smoothing capacitor C3 having a high potential to the second capacitor C2 having a low potential. The operation mode at this time is called [Phase 6].

Next, when the second switch S2 is turned off, the first inductor L1 causes the first current IL1 to continue flowing in the same direction as that in the operation mode [Phase 6] by the reactor energy. Thus, as shown in FIG. 9, the first current IL1 flows in the direction in which the first capacitor C1 is charged from the ground potential GND through the first diode D1. Similarly, the second current IL2 flows in the direction in which the second capacitor C2 is charged from the ground potential GND through the first diode D1. The operation mode at this time is called [Phase 7].

Next, when the charge of the second capacitor C2 is sufficiently stored, the direction of the second current IL2 is reversed. By this, as shown in FIG. 10, the second current IL2 flows in the direction to the first LC circuit 102. The operation mode at this time is called [Phase 8].

In the operation mode [Phase 8], the current flowing from the ground potential GND through the diode D1 is decreased by the amount of the second current IL2 flowing from the ground potential GND to the second capacitor C2 in the operation mode [Phase 7]. However, at this time point, since the first current IL1 is higher than the second current IL2, the potential Vm at the connection point X1 becomes equal to the ground potential GND.

Thereafter, the current flowing through the first diode D1 is stopped. When the first current IL1 becomes equal to the second current IL2, as shown in FIG. 11, the first current IL1 flowing through the first diode D1 is stopped. Then, the first current IL1 detected by the first current detection part 107 becomes equal to the second current IL2 detected by the second current detection part 108. That is, the controller 110 determines that the current balance state occurs. The operation mode at this time is called [Phase 9].

In the operation mode [Phase 9], a current through the first diode D1 does not flow. Thus, the potential Vm at the connection point X1 becomes an intermediate voltage between the voltage of the smoothing capacitor C3 and the ground potential GND.

If the controller 110 determines that the current balance state occurs, the second switch S2 is again turned on. Then, the closed circuit of the AC power supply 101, the first LC circuit 102, the second switch S2, the smoothing capacitor C3 and the resistor R1 is formed. As a result, as shown in FIG. 12, the first current IL1 flows in the direction from the smoothing capacitor C3 to the first LC circuit 102 through the second switch S2. Besides, when the second switch S2 is turned on, the closed circuit of the second switch S2, the smoothing capacitor C3, the resistor R2, the load 105 and the second LC circuit 104 is also formed. As a result, the second current IL2 also flows in the direction from the second capacitor C2 to the smoothing capacitor C3 through the second switch S2. The operation mode at this time is called [Phase 10].

Thereafter, when the potential of the smoothing capacitor C3 becomes higher than the potential of the second capacitor C2, the direction of the second current IL2 is reversed. That is, a return is made to the operation mode [Phase 6]. After this, during the period in which the polarity of the voltage of the AC power supply 101 is negative, the power conversion apparatus 100 repeats the cycle of the operation mode [Phase 6]→[Phase 7]→[Phase 8]→[Phase 9]→[Phase 10]→[Phase 6].

Figure 13:
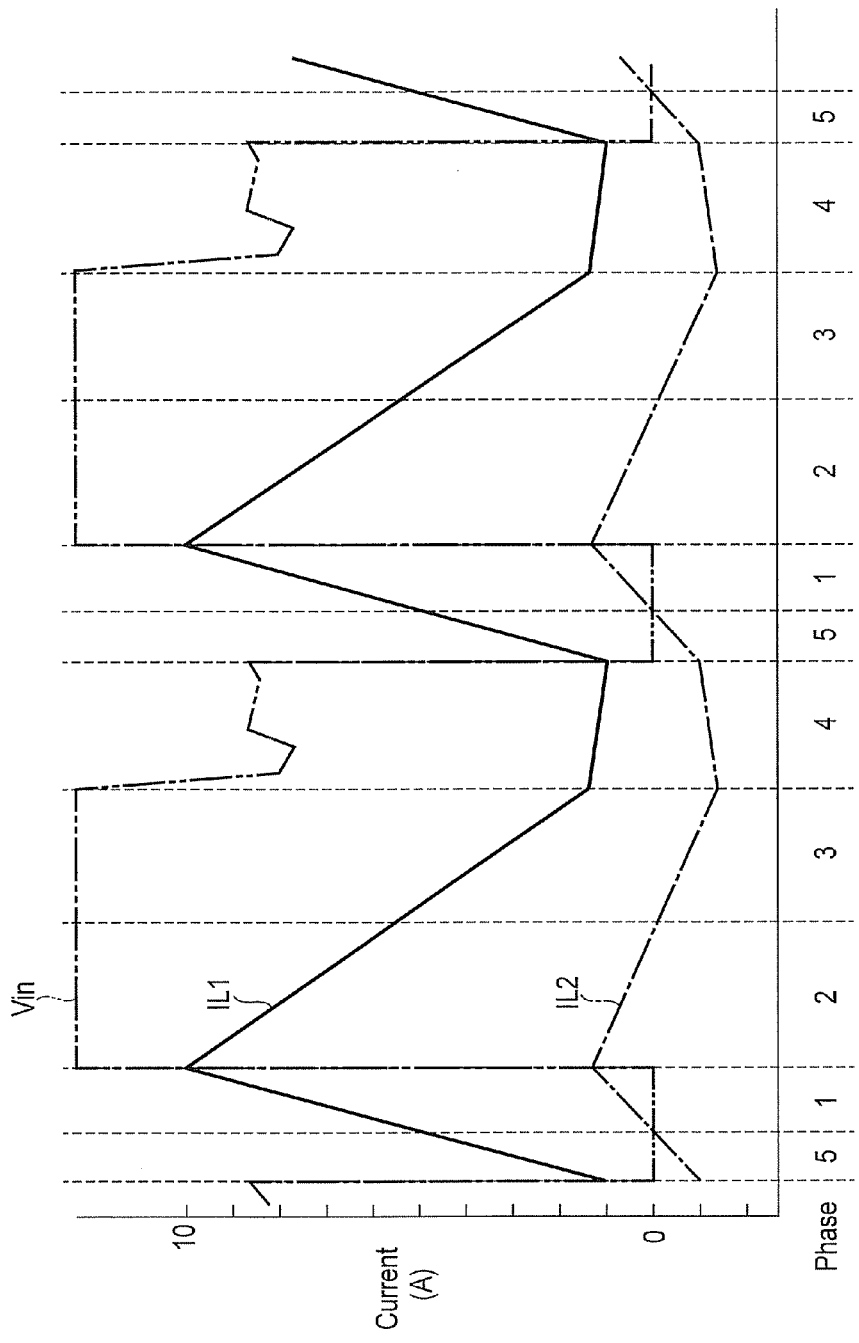
FIG. 13 is a waveform view showing the circuit currents IL1 and IL2 in the operation modes [Phase 1] to [Phase 5] and a voltage Vm at a connection point x1 between a first switch and a second switch.

FIG. 13 is a waveform view of the first current IL1, the second current IL2 and the voltage Vm at the connection point X1 in the respective operation modes [Phase 1], [Phase 2], [Phase 3], [Phase 4] and [Phase 5] when the polarity of the voltage of the AC power supply 101 is positive. In the drawing, a section in which the voltage is not determined corresponds to the operation mode [Phase 4]. In this section, although the gradient of the first current IL1 is opposite to that of the second current IL2, the values of the currents are almost equal to each other. In the case of FIG. 13, the first current IL1 is substantially 1 [A], and the second current IL2 is substantially −1 [A]. At this time, the current balance determination part 113 determines that the current balance state occurs. When the current balance state occurs, the gradients of the first current IL1 and the second current IL2 become gentle.

When the polarity of the voltage of the AC power supply 101 is positive and the switch S1 is off, the current balance state occurs. Then, the controller 110 outputs the first pulse signal P1 and turns on the first switch. Similarly, when the polarity of the voltage of the AC power supply 101 is negative and the second switch S2 is off, the current balance state occurs. Then, the controller 110 outputs the second pulse signal P2 and turns on the second switch.

As stated above, the power conversion apparatus 100 waits for the occurrence of the current balance state and shifts the first or the second switch S1 or S2 into the on cycle. By doing so, the power conversion apparatus 100 can reduce the power loss. The reason will be described with reference to FIG. 14 and FIG. 15.

The power conversion apparatus 100 includes the second LC circuit 104. It is assumed that the second LC circuit 104 is no provided. Then, when the polarity of the voltage of the AC power supply 101 is positive, the operation mode becomes only the mode [Phase 1] in which the first switch S1 is in the on state and the mode [Phase 2] in which the first switch S1 is in the off state.

Figure 14:
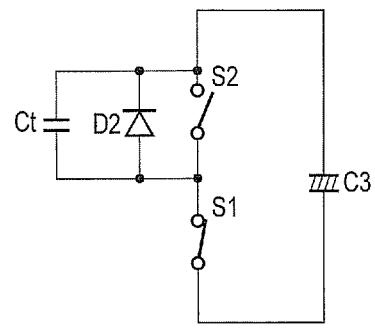
Figure 15:
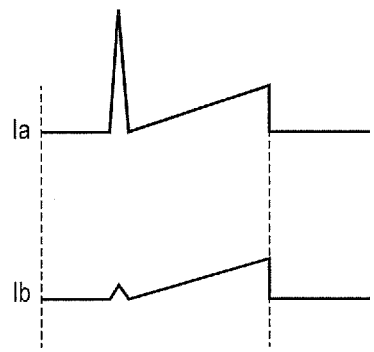
FIG. 15 is a view showing signal waveforms when a second LC circuit exists and when the circuit does not exist.

That is, first, the first switch S1 is turned on in the operation mode [Phase 1], and the first current IL1 flows through the first switch S1. Next, the first switch S1 is turned off in the operation mode [Phase 2], and the first current IL1 flows through the second diode D2. Thereafter, the first switch S1 is again turned on, and the first current IL1 flows through the first switch S1. As shown in FIG. 14, an equivalent circuit at this time corresponds to a state in which a parasitic capacitor Ct is connected in parallel to the second diode D2.

The second diode D2 has a recovery characteristic by the parasitic capacitor Ct. Thus, the second diode D2 functions as a capacitor in the transition from a conducting state to a blocking state. Accordingly, when a return is made from the operation mode [Phase 2] to the operation mode [Phase 1], the first switch S1 is conducted. When the first switch S1 is conducted, a through current flows from the smoothing capacitor C3 through the second switch S2 and the first switch S1. The through current is not blocked. Thus, as indicated by a waveform Ia of FIG. 15, a spike current extremely higher than a normal current is generated. A switching loss is generated by this spike current, and the power conversion efficiency of the power conversion apparatus is remarkably deteriorated.

On the other hand, in the power conversion apparatus 100 including the second LC circuit 104, the operation mode [Phase 3], the operation mode [Phase 4] and the operation mode [Phase 5] are continuously performed after the operation mode [Phase 2]. Particularly, the operation mode [Phase 4] exists in which the current balance state occurs in which the input current IL1 and the output current IL2 are substantially equal to each other. At the time point when the current balance state occurs, the diode recovery of the second switch S2 is already completed. Thus, even if the first switch S1 is turned on in the next operation mode [Phase 5], a through current does not flow. Thus, as indicated by a waveform Ib of FIG. 15, a spike current is not generated. Accordingly, in the power conversion apparatus 100, the power loss can be greatly improved. Besides, in the state of the operation mode [Phase 4], the potential at the connection point X1 is lower than the potential of the smoothing capacitor C3. Thus, in the power conversion apparatus 100, the switching loss is also improved.

The operation and the effect as stated above are obtained also when the polarity of the voltage of the AC power supply 101 is negative and the cycle of the operation mode [Phase 6]→[Phase 7]→[Phase 8]→[Phase 9]→[Phase 10]→[Phase 6] is repeated.

Second Embodiment

Figure 16:
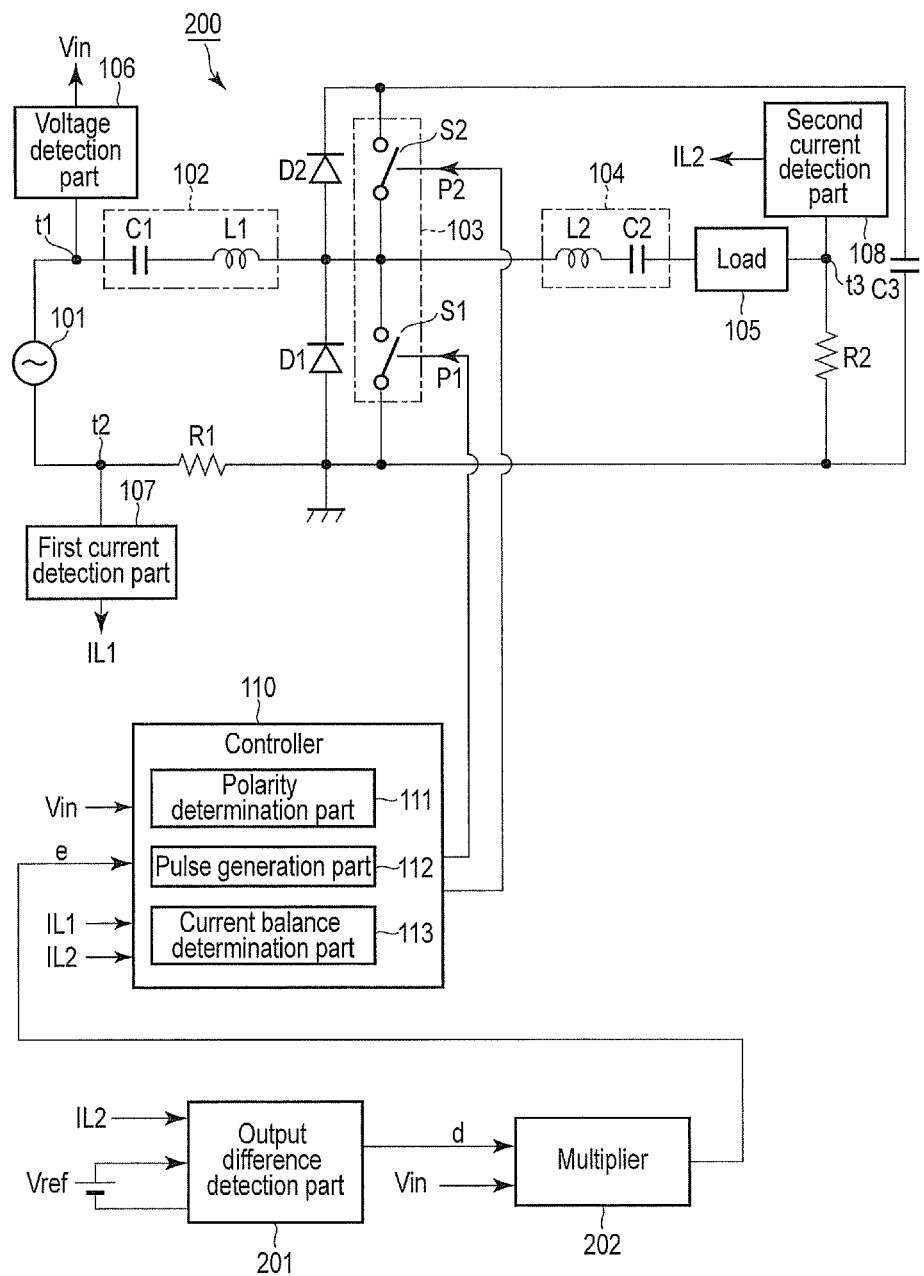
FIG. 16 is a total structural view including a main circuit of a power conversion apparatus of a second embodiment.

FIG. 16 is a circuit structural view of a power conversion apparatus 200 of a second embodiment. Incidentally, a portion common to that of the power conversion apparatus 100 of the first embodiment is denoted by the same reference numeral and its detailed description will be omitted.

As is apparent from the comparison between FIG. 16 and FIG. 1, in the power conversion apparatus 200, an output difference detection part 201 and a multiplier 202 are added to the power conversion apparatus 100.

The output difference detection part 201 inputs a current IL2 detected by a second current detection part 108, and converts the current IL2 to a DC voltage. The DC voltage is applied to a load 105 connected in series to a second LC circuit 104. The output difference detection part 201 compares the DC voltage with a reference voltage Vref and generates a current increase-decrease coefficient d. The increase-decrease coefficient d is outputted to the multiplier 202.

The multiplier 202 generates an assumed current value e in an input voltage Vin. The assumed current value e is calculated by multiplying the voltage Vin of an AC power supply 101 detected by a voltage detection part 106 by the increase-decrease coefficient d generated by the output difference detection part 201. The calculated assumed current value e is outputted to a controller 110.

For example, if it is assumed that the voltage Vin of the AC power supply 101 is AC 100 volts, the increase-decrease coefficient d is a result of a comparison between a voltage pulsating between 0 and 141 volts and the reference voltage Vref. Besides, the assumed current value e as the output of the multiplier 202 has a similar shape to a waveform obtained by multiplying the waveform of the voltage Vin by the increase-decrease coefficient d.

Similarly to the first embodiment, the controller 110 outputs a first pulse signal 21 when the polarity of the voltage of the AC power supply 101 determined by a polarity determination part 111 is positive, and outputs a second pulse signal P2 when the polarity is negative. However, timing when the pulse signal P1, P2 is changed from on to off is different from the first embodiment.

That is, with respect to the pulse signal P1, P2 generated by a pulse generation part 112, the controller 110 determines that a period until the current IL1 detected at a terminal t2 becomes equal to the assumed current value e is an on period. On the other hand, similarly to the first embodiment, an off period of the pulse signal P1, P2 is a period until a current balance determination part 113 determines that a current balance state occurs.

The controller 110 controls the pulse signal P1, P2 as stated above, so that the power conversion apparatus 200 can generate an input current waveform substantially equal to the input voltage waveform.

Figure 17:
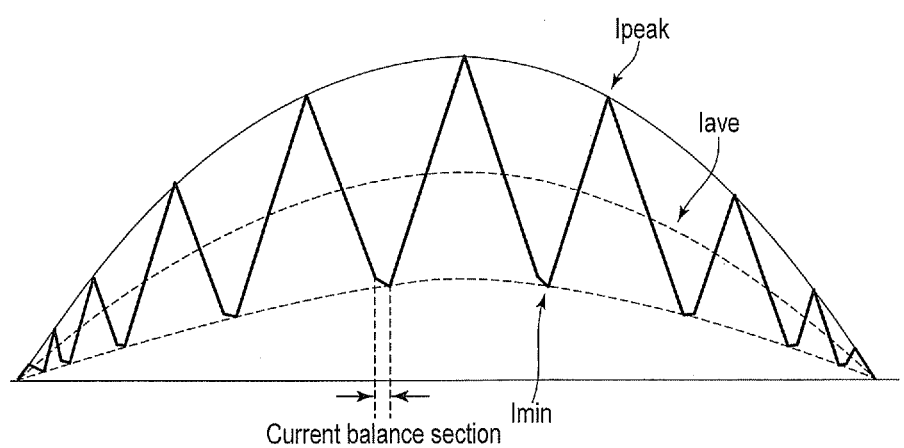
FIG. 17 is a waveform view showing a circuit current I when the voltage of an AC power supply is positive.

For example, in FIG. 17, if it is assumed that the current balance section is short, an average current waveform Iave can be approximated by following expression (1). Incidentally, in the expression (1), Ipeak denotes a peak current when the pulse signal P1, P2 is changed from on to off, and Imin denotes a minimum current when the pulse signal P1, P2 is changed from off to on.

$$Iave=(Ipeak-Imin) \quad (1)$$

In this case, if it is assumed that the average current waveform Iave is the assumed current value e outputted from the multiplier 202, the controller 110 controls so that the on section is ended at a value of the peak current Ipeak satisfying following expression (2).

$$Iave=(Ipeak-Imin)/2 \quad (2)$$

Incidentally, when the current balance section is made long, an appropriate approximate expression has only to be established.

Also in the second embodiment, the recovery loss can be reduced similarly to the first embodiment.

The related art power conversion apparatus requires a diode bridge circuit to full-wave rectify an alternating current from an AC power supply and a power factor improving converter to raise a full-wave rectified DC voltage. On the other hand, in the power conversion apparatus 100, 200, the power conversion function comparable to or higher than the related art can be obtained even if the diode bridge circuit and the power factor improving converter are not used. Accordingly, the power conversion efficiency can be remarkably improved.

Besides, in the related art, four diodes in the diode bridge circuit, one switch and one diode in the power factor improving converter are required, that is, the six power semiconductor devices in total are required. On the other hand, the power conversion apparatus 100, 200 can be configured by two devices, that is, the first switch S1 and the second switch S2. Accordingly, the power conversion apparatus 100, 200 can be provided which is inexpensive as compared with the related art, and is small and light-weight.

Incidentally, the invention is not limited to the above embodiments.

For example, in the power conversion apparatus 100, 200 of the embodiment, although the switch S1, S2 is a mechanical switch, the switch S1, S2 is not limited to the mechanical switch. A device functioning as a switch in a forward direction and as a diode in a reverse direction, for example, a MOS field effect transistor (FET) may be used as the switch S1, S2. Since the MOS field effect transistor includes a body diode, the diode D1, D2 can be omitted. Besides, a semiconductor switch capable of controlling current conduction and non-conduction in both directions and having no body diode, for example, a triac can also be used as the switch S1, S2. In this case, the diode D1, D2 is required.

FIG. 18 is a circuit diagram of a case where MOS field effect transistors Q1 and Q2 are used instead of the switches S1 and S2. A drain terminal of the first field effect transistor Q1 is connected to a first LC circuit 102, and a source terminal of the first field effect transistor Q1 is connected to the other end of an AC power supply 101. Besides, a source terminal of the second field effect transistor Q2 is connected to a connection point X1 between the first LC circuit 102 and the drain terminal of the first field effect transistor Q1, and a drain terminal of the second field effect transistor Q2 is connected to a smoothing capacitor C3. Also in this structure, the power conversion apparatus 100, 200 operates in the same operation mode as the first or the second embodiment.

Besides, in the above embodiments, although the load 105 is connected in series to the second LC circuit 104, the connection place of the load 105 is not limited to the place. FIG. 19 shows a case where a voltage generated at both ends of a smoothing capacitor C3 is used to drive a second load 301. In this case, a first load 105 connected in series to a second LC circuit 104 can be driven by a high-frequency alternating current, and the second load 301 can be driven by a direct current.

Incidentally, the load 105 is not limited to a resistor. For example, the load may be a fluorescent lamp with a filament. In this case, a stable high-frequency current can be made to flow through the fluorescent lamp by using the reactor action of the second inductor L2 in the second LC circuit 104. Besides, a power supply unit which is insulated by a transformer and generates an arbitrary DC voltage in a secondary winding may be connected as the load 105.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
a first LC circuit that includes a first capacitor and a first inductor connected in series to each other and is connected to an AC power supply;
a first switch that connects, at a terminal of the first switch, to a terminal of the AC power supply through the first LC circuit and connects, at an other terminal of the first switch, to an other terminal of the AC power supply;
a second switch that connects, at a terminal of the second switch, to a connection point between the terminal of the first switch and the first LC circuit;
a smoothing capacitor that connects, at a terminal of the smoothing capacitor, to an other terminal of the second switch and connects, at an other terminal of the smoothing capacitor, to a connection point between the other terminal of the first switch and the other terminal of the AC power supply;
a second LC circuit connected to a second capacitor and a second inductor in series, wherein a terminal of the second LC circuit is connected to a connection point between the first switch and the second switch, and an other terminal of the second LC circuit is connected to a load and forms a series circuit between the connection point between the first switch and the second switch and the load; and
a controller that outputs a first pulse signal for pulse-driving the first switch when a voltage polarity of the AC power supply is positive, and outputs a second pulse signal for pulse-driving the second switch when the voltage polarity of the AC power supply is negative.

2. The apparatus of claim 1, further comprising
a voltage detection part to detect a voltage of the AC power supply, and
a polarity determination part to determine whether the polarity of the voltage detected by the voltage detection part is positive or negative.

3. The apparatus of claim 2, wherein
the controller outputs the first pulse signal or the second pulse signal according to the polarity determined by the polarity determination part.

4. The apparatus of claim 1, further comprising
a first current detection part to detect a first current flowing through the first inductor,
a second current detection part to detect a second current flowing through the second inductor, and
a current balance determination part to compare the first current with the second current and to determine whether the currents are equal to each other.

5. The apparatus of claim 4, wherein
if the current balance determination part determines that the first current and the second current are equal to each other in a section of an off cycle when the first or the second switch is pulse-driven, the controller shifts the cycle to a next on cycle.

6. The apparatus of claim 4, further comprising
a voltage detection part to detect a voltage of the AC power supply,
an output difference detection part that converts the second current detected by the second current detection part to a voltage applied to the load connected in series to the second LC circuit, compares the voltage with a reference voltage and outputs a difference, and
a multiplier to multiply the voltage detected by the voltage detection part by the difference output outputted from the output difference detection part.

7. The apparatus of claim 6, wherein
the controller regulates a current value of an on cycle of the first switch or the second switch based on an output value of the multiplier.

8. The apparatus of claim 1, wherein
a second load is connected to both ends of the smoothing capacitor.

9. The apparatus of claim 1, wherein
the first and the second switches are semiconductor switches each including a body diode.

10. The apparatus of claim 1, wherein
the first and the second switches are mechanical switches or semiconductor switches not including a body diode, and a diode is externally attached in parallel to each of the first and the second switches.

* * * * *